United States Patent
Livingston

(10) Patent No.: US 8,999,170 B2
(45) Date of Patent: Apr. 7, 2015

(54) PEAK FLOW MANAGEMENT IN WASTEWATER TREATMENT USING DIRECT MEMBRANE FILTRATION

(75) Inventor: Dennis Livingston, Austin, TX (US)

(73) Assignee: Ovivo Luxembourg S.à.r.l., Munsbach (LU)

( * ) Notice: Subject to any disclaimer, the term of this patent is extended or adjusted under 35 U.S.C. 154(b) by 0 days.

(21) Appl. No.: 13/516,708

(22) PCT Filed: Dec. 17, 2010

(86) PCT No.: PCT/US2010/061076
§ 371 (c)(1),
(2), (4) Date: Jun. 21, 2012

(87) PCT Pub. No.: WO2011/075666
PCT Pub. Date: Jun. 23, 2011

(65) Prior Publication Data
US 2012/0255902 A1    Oct. 11, 2012

Related U.S. Application Data

(60) Provisional application No. 61/389,650, filed on Oct. 4, 2010, provisional application No. 61/288,080, filed on Dec. 18, 2009.

(51) Int. Cl.
| | | |
|---|---|---|
| *C02F 9/00* | (2006.01) | |
| *C02F 3/06* | (2006.01) | |
| *B01D 61/14* | (2006.01) | |
| *C02F 1/28* | (2006.01) | |
| *C02F 1/44* | (2006.01) | |
| *C02F 1/52* | (2006.01) | |
| *C02F 3/12* | (2006.01) | |
| *C02F 3/30* | (2006.01) | |
| *C02F 11/04* | (2006.01) | |
| *C02F 101/10* | (2006.01) | |
| *C02F 101/16* | (2006.01) | |

(52) U.S. Cl.
CPC ............... *C02F 9/00* (2013.01); *B01D 61/145* (2013.01); *B01D 2315/06* (2013.01); *C02F 1/281* (2013.01); *C02F 1/283* (2013.01); *C02F 1/444* (2013.01); *C02F 1/5236* (2013.01); *C02F 3/1268* (2013.01); *C02F 3/30* (2013.01); *C02F 11/04* (2013.01); *C02F 2101/105* (2013.01); *C02F 2101/16* (2013.01); *C02F 2301/043* (2013.01); *C02F 2303/24* (2013.01)

(58) Field of Classification Search
CPC .......... C02F 1/444; C02F 1/5245; C02F 1/52; C02F 1/001; C02F 3/1268; C02F 9/00; C02F 2103/001; B01D 2311/04; B01D 61/145; B01D 61/16; B01D 2311/08
USPC ......... 210/605, 607, 608, 609, 631, 704, 709, 210/744, 747.2, 747.3
See application file for complete search history.

(56) References Cited

U.S. PATENT DOCUMENTS

| | | | | |
|---|---|---|---|---|
| 4,749,494 | A * | 6/1988 | Tomoyasu et al. | 210/626 |
| 5,902,477 | A * | 5/1999 | Vena | 210/162 |
| 7,329,344 | B2 * | 2/2008 | Jordan et al. | 210/195.1 |
| 7,459,083 | B1 * | 12/2008 | Hong et al. | 210/620 |
| 7,491,337 | B2 * | 2/2009 | Karaman | 210/723 |

OTHER PUBLICATIONS

Bendick, "Feasibility of Cross-Flow Microfiltration for Combined Sewer Overflows," 2003, University of Pittsburgh School of Engineering, Thesis, pp. 1-123.*
Hamada et al, "Reuse of carwash water with a cellulose acetate ultrafiltration membrane aided by flocculation and activated carbon treatments," 2004, Desalination 169, pp. 257-267.*

* cited by examiner

*Primary Examiner* — Nam Nguyen
*Assistant Examiner* — Claire Norris
(74) *Attorney, Agent, or Firm* — Thomas M. Freiburger

(57) ABSTRACT

A biological wastewater treatment system includes an equalization tank for sending a defined first portion of the wastewater to a submerged membrane filter. When the quantity of the received wastewater exceeds the defined first portion, a second portion of wastewater, formed from the wastewater that exceeds the defined first portion, is sent to a filtration process. The filtration process includes adding a flocculating agent to the second portion entering filtration, filtering the second portion, thereby producing retentive waste including flocculated material, and then sending the retentive waste to the submerged membrane filter.

11 Claims, 2 Drawing Sheets

PEAK FLOW MANAGEMENT IN WASTEWATER TREATMENT USING DIRECT MEMBRANE FILTRATION

TECHNICAL FIELD

The present disclosure is directed toward wastewater treatment processes, and more particularly toward a peak flow management process for use with submerged membrane bioreactors.

BACKGROUND ART

It is known that a chemical coagulant, such as alum, may be added to a bioreactor to precipitate soluble phosphates to reduce phosphorous discharge. It is also known that biological phosphorus removal is augmented by addition of metal salts such as ferric chloride or alum. These can be added directly into the aerobic zone of a reactor to chemically bind the phosphate. It is also known that alum coagulant enhances the filterability of a mixed liquor sample.

Submerged membrane bioreactors (MBR) generally have a limited capacity to handle hydraulic peak loads. As such, new wastewater treatment plants are substantially overdesigned to handle typical average annual flows or even increased flows during maximum monthly flows. Designing a MBR plant to handle the highest expected peak instantaneous flow often drives up capital costs and increases operating costs.

Energy costs can make up more than 50% of the total operating cost of a wastewater treatment plant using low pressure membrane filtration. In MBR plants, keeping hydraulic capacity online to handle a transient instantaneous flow means sustaining a large inventory of biosolids. The upkeep of biosolids during periods of low flow is expensive, as the microorganisms require oxygen to live. Oxygen is supplied through diffused air driven by blowers. Blower operation for membrane air scouring of membranes and oxygen delivery can make up 25% to 50% of the total electrical load in a MBR plant depending on the design.

The peak hydraulic capacity of submerged membrane bioreactor systems is generally on the order of twice the rated average capacity of the facility. In certain regions where heavy rainfall and or rapid snow melt are prevalent, short-term hydraulic peaks can vary between 2-10 times average flows for hours, days and even weeks. For systems with such large transient peaking factors, it is cost prohibitive to build and operate a MBR.

For wastewater treatment facilities designed for biological nutrient removal (nitrogen and phosphorous), one of the challenges is to deal with additional load coming from sludge digestion step, in the form of a supernatant. During aerobic or anaerobic digestion of the waste solids, the phosphorous and ammonia rich supernatant stream is generated which needs to be treated prior to discharge. In a prior art system, influent enters a process at an anoxic zone for denitrification. Denitrified wastewater is sent to an aerobic zone for nitrification and removal of soluble biochemical oxygen demand. Partially biologically treated wastewater is then fully nitrified and filtered in a membrane zone. Permeate can be subjected to additional treatment depending on the application (e.g. uv disinfection).

In this typical process, it is generally cost prohibitive to construct dedicated equalization to pick up more than very short flows lasting on the order of hours that exceed the filtration capacity of the membranes. Even capturing peak hour flows can escalate costs depending on the hydraulic peak and the duration of the event.

Also, in a prior art system, the supernatant from the digestion step is sent back to the submerged membrane bioreactor system.

DISCLOSURE OF INVENTION

Technical Solution

The wastewater treatment system of the disclosure can efficiently trim (or manage) short-term peak events in MBR plants while meeting the most stringent permit limits. More particularly, the biological wastewater treatment system includes an equalization tank for sending a defined first portion of the wastewater to a submerged membrane filter. When the quantity of the received wastewater exceeds the defined first portion, a second portion of wastewater, formed from the wastewater that exceeds the defined first portion, is sent to a filtration process. The filtration process includes adding a flocculating agent to the second portion entering filtration, filtering the second portion, thereby producing retentive waste including flocculated material, and then sending the retentive waste to the submerged membrane filter.

So, instead of treating peak instantaneous flow with MBR filtration capacity, the proposed disclosure uses offline ultra filtration, in combination with activated carbon and zeolite, depending on the needs of a given application. In this way, the offline ultra filtration treatment uses physical and chemical means to remove pollutants from pre-treated (screened) wastewater in lieu of biological processes. This offline capacity can be easily taken out of service and mothballed during periods of low flow, something less easily managed with MBR systems considering the need for a healthy activated sludge to resume treatment.

Using ultra filtration to treat raw wastewater is not common practice due to the high fouling potential of untreated sewage and related maintenance costs. Moreover, the use of activated carbon or zeolite to treat filtered raw sewage is considered cost prohibitive as a means of primary treatment. This disclosure combines ultra filtration and MBR to only treat temporary peak instantaneous flow conditions as needed and to discharge retentate to the online MBR system.

In a preferred embodiment, peak flows are diverted to the ultra filtration system. Filtered wastewater is sent to a bed of activated carbon and then to a zeolite filter. The whole process is meant to treat only short-term peak flow. The final product is co-mingled with the permeate from the MBR Process.

More particularly, the peak flow management process uses ultra filtration membranes to operate in conjunction with MBR systems. The ultra filtration system takes a side-stream of fine-screened plant influent and periodically sends retentate (rejected solids) to the MBR process. The rejected solids are removed from the biological process as part of waste activated sludge. For biological nutrient removal plants, activated carbon and zeolite media follows the ultra filtration step. The combined unit operations are intended to produce an effluent that meets all regulatory permit requirements including nutrient limits. Moreover, this new green technology does not require air scouring of any kind, significantly reducing energy usage and carbon footprint.

In a system and process of the disclosure, wastewater is segregated into two streams prior to biological treatment at flows exceeding some target value. Temporary peak flows are then treated in a physical-chemical treatment train including ultra filtration, PAC and zeolite.

To assist with filtration of raw wastewater, typically having a high fouling potential, a filter aid is added such as alum. The alum provides multiple benefits to the process in that retained floc is returned to the biological process for improved phosphorus removal and improved filterability of the sludge. Improved filterability in MBR Systems increases sustainable flux (throughput as filtration rate per membrane area). Improved filterability can also reduce chemical cleaning requirements and required air scouring intensity.

The filtered wastewater is then stripped of soluble biochemical oxygen demand by activated carbon and stripped of ammonia (primary form of nitrogen) by zeolite. Both of these media are commonly used in water treatment but not as commonly in wastewater treatment. As primary treatment, replacement costs can be high however in this disclosure pollutant loading is low given duration of short term peaks and expectation of diluted strength at storm flow conditions (diluted sewer waste).

Digestion of waste activated sludge produces supernatant that contains high amount of phosphorus as well as ammonia. In this disclosure, the supernatant from the digestion step is recycled back through the ultrafiltration step. The alum addition prior to ultrafiltration ensures chemical precipitation of phosphorous and the resultant chemical sludge is subsequently removed through ultrafiltration step. Ammonia in the supernatant stream is removed by ion exchange using the zeolite.

Figure 1:
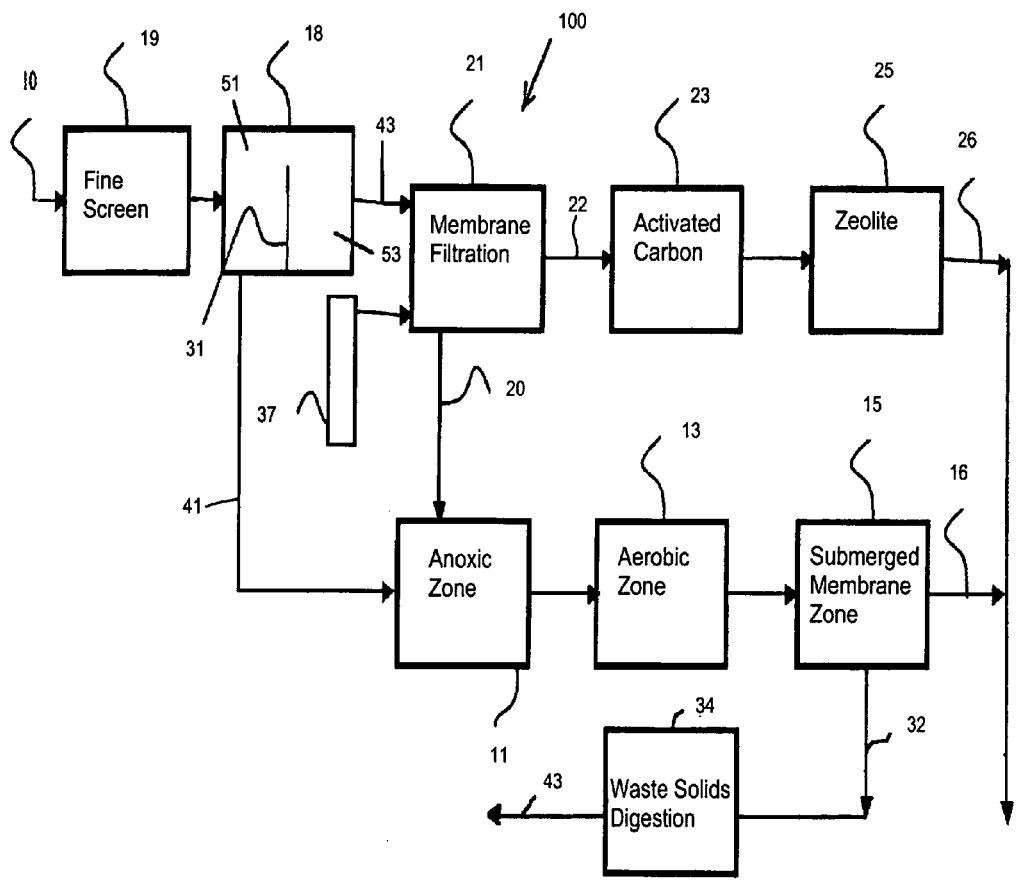
FIG. 1 is a simplified process flow diagram of the wastewater treatment system of this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

BEST MODE

The peak flow management process 100 illustrated in FIG. 1 was developed to operate in conjunction with an immersed membrane filter 15, and, more particularly, with submerged membrane bioreactor systems, as a means of augmenting treatment capacity during periods of high flow. The process is implemented by a biological wastewater treatment system 100 including a means 21 for direct filtration of screened wastewater, means 37 for dosing a filter aid such as alum, and an independent biological treatment system including membranes 15 for full biological treatment and solids separation through filtration.

More particularly, the biological wastewater treatment system and process disclosed includes an equalization tank 18 for sending a defined first portion of the wastewater to a submerged membrane filter 15. When the quantity of the received wastewater exceeds the defined first portion 41, a second portion 43 of wastewater, formed from the wastewater that exceeds the defined first portion 41, is sent to a filtration process. The filtration process includes adding 37 a flocculating agent to the second portion entering filtration, filtering 21 the second portion, thereby producing retentive waste 20 including flocculated material, and then sending the retentive waste to the submerged membrane filter 15.

As is known in the art, the equalization chamber 18 includes a first chamber 51 having a weir 31 for defining the first portion of wastewater, the second portion of wastewater going over said weir into a second chamber 53. In other embodiments, other means for providing equalization can be used. The wastewater first portion 41 is sent to the MBR process, which includes an anoxic zone 11, then an aerobic zone 13, and then the submerged bioreactor 15.

More particularly, the peak flow management process 100 uses ultra filtration membranes 21 to operate in conjunction with the MBR system 15, such as the one described in U.S. Pat. No. 6,843,908, incorporated herein by reference. The ultra filtration system 21 takes a side-stream of fine-screened plant influent and periodically sends retentate 20 (rejected solids) to the MBR process. The rejected solids are removed at 32 from the biological process as part of waste activated sludge. The waste activated sludge is sent to waste solids digestion 34. After digestion, a supernatant containing high amount of phosphorus as well as ammonia is recycled back at 43 through the ultra filtration step. The alum addition prior to ultra filtration ensures chemical precipitation of phosphorous and the resultant chemical sludge is subsequently removed through ultrafiltration step. Ammonia in the supernatant stream is removed by ion exchange using the zeolite.

For biological nutrient removal plants, activated carbon 23 and zeolite media 25 follows the ultra filtration step 21. The combined unit operations are intended to produce an effluent that meets all regulatory permit requirements including nutrient limits. Moreover, this new green technology does not require air scouring of any kind, significantly reducing energy usage and carbon footprint.

As shown in FIG. 1, the first step of the process is fine screening 19 the wastewater 10, followed by ultra filtration 21 for removal of total suspended solids, pathogens (such as bacteria and viruses) and turbidity. Filtrate can subsequently be passed through activated carbon for removal of biochemical oxygen demand and zeolite media for removal of ammonia (as ammonium ion). Retentate 20 (rejected solids) is periodically sent to the MBR process where the solids are eventually removed via waste activated sludge. The peak flow management process systems according to this disclosure are designed to produce permit-compliant effluent using direct filtration of raw wastewater followed by contact with well established, naturally occurring media. The whole process is meant to treat only short-term peak flow. The final product is co-mingled with the permeate from the MBR Process.

In the preferred embodiment, the ultra filtration 21 is provided by iSEP UF technology (manufactured by the TriSep Corp.). The iSEP technology proved well suited for this innovative treatment method. This ultra filtration device is illustrated in U.S. Pat. No. 7,585,411, which is incorporated herein by reference.

The iSEP Technology direct low-pressure filtration of raw wastewater will typically lead to rapid fouling and unsustainable performance. However, during peak flow management process testing, it was discovered that pre-conditioning wastewater with aluminum sulfate (alum) significantly reduced the rate of fouling when using iSep 500 UF membranes. Further testing indicated that membrane performance actually improved without air scouring.

The iSep Module iSep membranes utilize a 0.03-micron proprietary hydrophilic membrane chemistry specially designed for difficult waste streams with high fouling potential. The iSep membrane is an integrated submerged ultra filtration element where the membrane and tank have been integrated into a single module. Negative pressure is applied to generate a vacuum and pull water through the membrane.

In conventional applications, air is bubbled up through the flow channels to actively scour the membrane surface and remove particulate matter. However, integrated as a part of the peak flow management process system 100 of the disclosure, no air is required and retentate containing the alum dosed for fouling control is discharged to the main MBR system. Once added to the mixed liquor in the biological process, the alum will remove some phosphorus through sweep flocculation and other mechanisms. Eventually, added alum is wasted along with biological solids. Testing indicates net fluxes in excess of 30 gal per sq ft per day are sustainable with typical backwashing and alum dosing.

Figure 2:
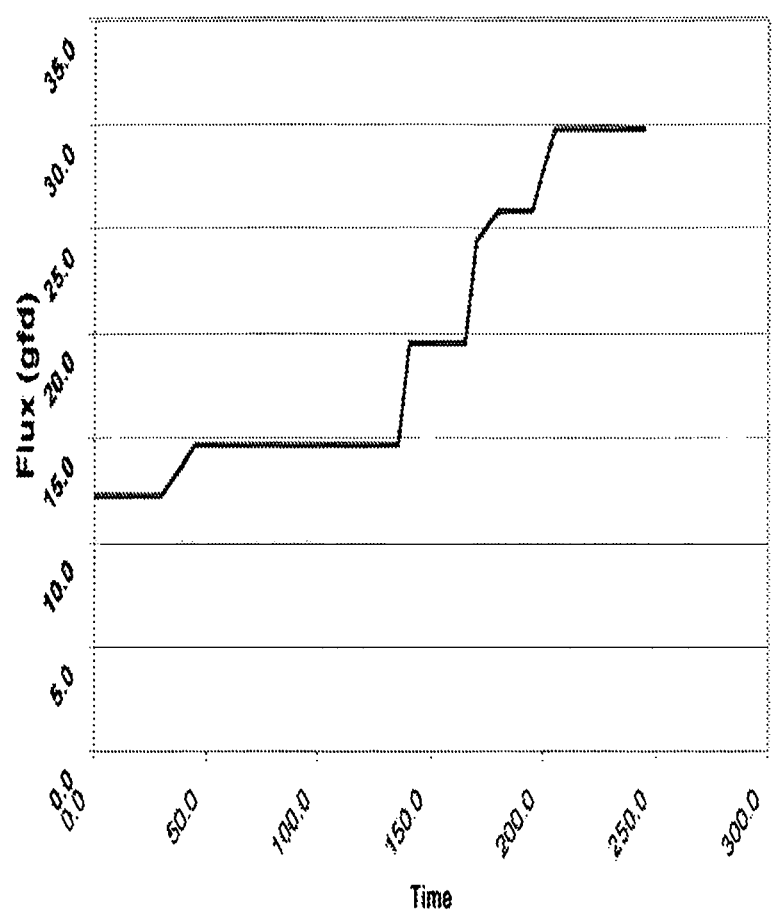
FIG. 2 is a table showing a sensitivity analysis of duration of peak events and sustainable flux.

Trials were conducted using standard municipal strength waste and diluted waste streams more representative of storm flows. Under all conditions energy usage for full treatment was on the order of 0.10 kWh/cu meter or about a quarter of the most efficient MBR. Similarly, the footprint to handle storm flows is roughly a quarter that of an MBR system. Capital and operating expenses proved economical and are a strong function of peaking factors, duration of peak events and sustainable flux, as the sensitivity analysis in FIG. 2 shows.

Testing revealed that the direct filtration 21 is often unsustainable regardless of membrane chemistry or configuration. However, with the addition of the filter aid 37 (e.g. alum in the form of alum, such as about 150 mg/l aluminum sulphate) the direct filtration 21 had substantially improved sustainable flux. The alum addition also aided in precipitation of phosphorus coming from the digestion supernatant stream. Field testing indicated that charging a fairly high concentration of alum to the wastewater prior to filtration improved performance. The retentate 20 containing coagulated aluminum phosphates, among other compounds, is then periodically rejected to the MBR process. The rejected, coagulated material flocculates additional phosphorus and has the additional benefit of improving the filterability of the sludge in the MBR Process.

From the filtration step 21, the permeate 22 is under pressure and subsequently filtered in two media beds; powder activated carbon or PAC 23 and, if necessary, zeolite 25. The carbon bed removes soluble biochemical oxygen demand until the carbon is spent and the bed replaced. Similarly, the mineral zeolite removes ammonium ion ($NH_4+$) through an ion exchange process. Depending on the media the bed can be regenerated or simply exchanged. The filtered, treated side stream 26 is then combined with the output from the bioreactor 15 to produce a stream intended to meet typical wastewater permit requirements without further treatment.

Testing was done to verify the feasibility of the process. In particular, sustainable flux and normalized energy demand were evaluated. UF membranes with a nominal 0.03 m pore size were used during testing. The membrane geometry was spiral wound flat-sheet with an integral air scouring device and backwashing mechanism. Fluxes up to 30 gfd proved to be sustainable at constant permeability (see FIG. 2). The characteristics of the screened (influent) wastewater and permeate are given in the following table.

TABLE 1

| Influent/Effluent Quality | | | |
|---|---|---|---|
| Parameter | Influent | Effluent | Unit |
| Turbidity: | 242 | <0.1 | NTU |
| TSS: | 328 | <1.0 | mg/l |

Based on the results of the pilot testing, a design and economic analysis was prepared to demonstrate the feasibility of the process. Energy usage for reuse quality effluent meeting Title 22 standards is on the order of 0.14 kWh/m3 or about ⅓ the most efficient MBR demand found in the literature of 0.39 kWh/m3. Capital and operating expenses proved economical and are a strong function of peaking factors, duration of peak events and sustainable flux as sensitivity analysis will show.

Various other features and advantages of the disclosure will be apparent from the following claims.

The invention claimed is:

1. A process for treating sewage wastewater, using non-biological treatment of an overflow side stream only during peak flow periods, comprising the steps of:
   receiving sewage wastewater,
   sending a defined first portion of said received sewage wastewater to biological treatment and to a submerged membrane filter for membrane bioreactor (MBR) filtration, and when in a peak flow period the quantity of said received sewage wastewater exceeds said defined first portion,
   forming a second portion of sewage wastewater from the received sewage wastewater that exceeds said defined first portion, and sending said second portion to a non-MBR ultra filtration process,
   adding a flocculating agent to the second portion entering the non-MBR ultra filtration process,
   filtering said second portion, thereby producing retentive waste including flocculated material and producing a permeate,
   sending said retentive waste to said biological treatment and submerged membrane filter for MBR filtration,
   treating said permeate to remove biochemical oxygen demand,
   treating said permeate to remove ammonia, and
   combining the resulting filtered, treated side stream with output from the MBR filtration to produce a combined stream to meet a required standard for treated wastewater without further treatment.

2. A process in accordance with claim 1, and further including the step of sending solids from said submerged membrane filter to waste solids digestion, and then sending supernatant from said waste solids digestion to said non-MBR ultra filtration process.

3. A process in accordance with claim 1, wherein the non-MBR ultra filtration process comprises low pressure ultra filtration.

4. A process in accordance with claim 3, wherein the non-MBR ultra filtration process comprises 0.03 micron membranes.

5. A process in accordance with claim 3, wherein the non-MBR ultra filtration process does not include air scouring.

6. A process in accordance with claim 1, wherein the flocculating agent is alum.

7. A process in accordance with claim 6, wherein the added alum is about 150 mg/l aluminum sulphate.

8. A process in accordance with claim 1, wherein said second portion of sewage wastewater is sent to the non-MBR ultra filtration process untreated except for a preliminary step of screening the received sewage wastewater.

9. A process in accordance with claim 1, wherein the step of treating of the permeate to remove biological oxygen demand comprises treatment with activated carbon.

10. A process in accordance with claim 9, wherein the step of treating the permeate to remove ammonia comprises treatment with zeolite.

11. A process in accordance with claim 1, wherein the step of sending said retentive waste to the submerged membrane filter includes the further steps of treating the retentive waste along with said defined first portion of sewage wastewater in an anoxic zone and an aerobic zone, for nitrification and denitrification to remove nitrogen and ammonia, serving as said biological treatment.

* * * * *